United States Patent
Ellison et al.

(10) Patent No.: US 10,493,865 B2
(45) Date of Patent: Dec. 3, 2019

(54) VEHICLE SEAT DUAL-MOTION ACTUATOR AND METHOD

(71) Applicant: Honda Motor Co., Ltd., Tokyo (JP)

(72) Inventors: Terrie L. Ellison, Hilliard, OH (US); Christopher Styn, Powell, OH (US); Derek S. Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 15/884,511

(22) Filed: Jan. 31, 2018

(65) Prior Publication Data

US 2019/0232821 A1    Aug. 1, 2019

(51) Int. Cl.
| | |
|---|---|
| *B60N 2/02* | (2006.01) |
| *B60N 2/225* | (2006.01) |
| *F16H 19/00* | (2006.01) |
| *F16H 1/28* | (2006.01) |
| *F16H 1/16* | (2006.01) |
| *B60N 2/20* | (2006.01) |

(52) U.S. Cl.
CPC ......... *B60N 2/0252* (2013.01); *B60N 2/0228* (2013.01); *B60N 2/0232* (2013.01); *B60N 2/2251* (2013.01); *F16H 1/28* (2013.01); *F16H 19/005* (2013.01); *B60N 2/206* (2013.01); *B60N 2002/0236* (2013.01); *B60N 2002/0256* (2013.01); *F16H 1/16* (2013.01); *F16H 2019/008* (2013.01)

(58) Field of Classification Search
CPC .. B60N 2/0252; B60N 2/0228; B60N 2/0232; B60N 2/2251; F16H 1/28; F16H 19/005
See application file for complete search history.

(56) References Cited

U.S. PATENT DOCUMENTS

| | | | |
|---|---|---|---|
| 4,691,584 A | * | 9/1987 | Takaishi .................. E05B 81/06 292/144 |
| 6,940,032 B2 | | 9/2005 | Sirajtheen et al. |
| 7,243,769 B2 | | 7/2007 | Voelkert |
| 8,622,864 B2 | | 1/2014 | Fauteux et al. |
| 2005/0072257 A1 | | 4/2005 | Shimanek |
| 2013/0162000 A1 | * | 6/2013 | Kume ...................... B60N 2/90 297/463.1 |

FOREIGN PATENT DOCUMENTS

| | | |
|---|---|---|
| EP | 0736738 | 9/1999 |
| KR | 20080000789 | 1/2008 |

* cited by examiner

*Primary Examiner* — Mark J Beauchaine
(74) *Attorney, Agent, or Firm* — Rankin, Hill & Clark LLP

(57) ABSTRACT

A single motor dual-motion actuator and method for a vehicle seat includes a pin actuator rotatable in the first rotatable direction from a pin actuator rest position toward a pin actuator first position and rotatable in a second rotatable direction from the pin actuator rest position toward a pin actuator second position. The actuator further includes a first actuator component and a second actuator component. The first actuator component is co-rotatable with the pin actuator from a first actuator component rest position in the first rotatable direction toward a first actuator component actuating position when the pin actuator is rotated to the pin actuator first position. The second actuator component is co-rotatable with the pin actuator from a second actuator component rest position in the second rotatable direction toward a second actuator component actuating position when the pin actuator is rotated to the pin actuator second position.

20 Claims, 8 Drawing Sheets

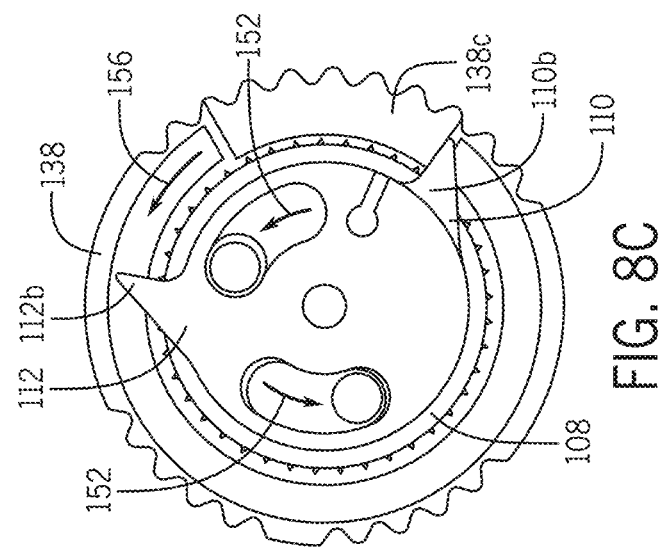
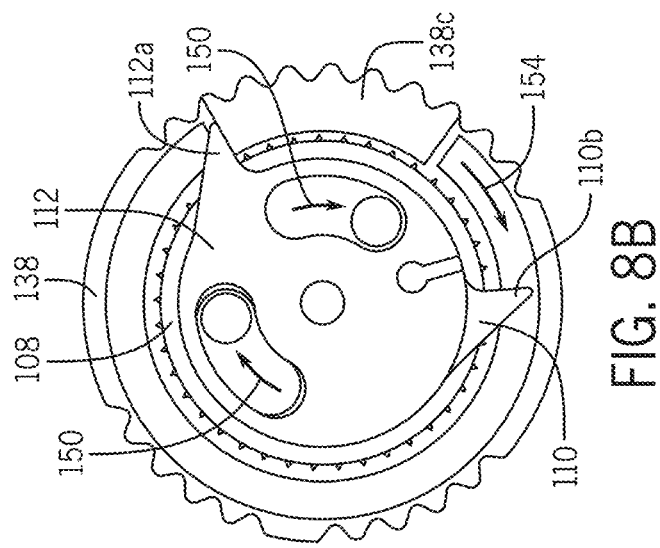
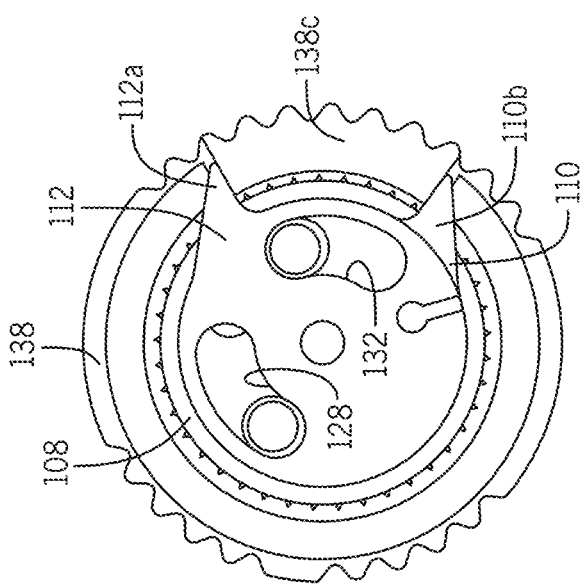
FIG. 8A
FIG. 8B
FIG. 8C

VEHICLE SEAT DUAL-MOTION ACTUATOR AND METHOD

BACKGROUND

Vehicle manufacturers continue to apply customer convenience features to vehicle seats. For example, vehicle seats are sometimes designed so that the seatback can partially fold forward and the seat base slide forward to allow access behind the vehicle seat (e.g., for a passenger entering a third row). Alternatively, the vehicle seat may allow for the seatback to be folded flat, such as when desirable for carrying large cargo in the vehicle passenger compartment. Often, these convenience features are enabled by manually pulling an actuator lever, handle, or similar manual actuating device. In some vehicles, manual pulling of an actuator is replaced by an electronic actuator, such as a push button associated with an electrically controlled motor. For these seats, the user can simply press a button, which instructs a controller via a signal to operate a motor that, in turn, drives an actuator for powered operation of the vehicle seat feature. One drawback of this arrangement is that a separate motor and corresponding actuator is required for each seat feature desired to be operated via an electronic push button.

SUMMARY

According to one aspect, a single motor dual-motion actuator for a vehicle seat includes a pin actuator rotatable in a first rotatable direction from a pin actuator rest position toward a pin actuator first position and rotatable in a second rotatable direction from the pin actuator rest position toward a pin actuator second position, wherein the second rotatable direction is opposite the first rotatable direction. The single motor dual-motion actuator further includes a first actuator component and a second actuator component. The first actuator component is co-rotatable with the pin actuator from a first actuator component rest position in the first rotatable direction toward a first actuator component actuating position when the pin actuator is rotated to the pin actuator first position. The second actuator component is co-rotatable with the pin actuator from a second actuator component rest position in the second rotatable direction toward a second actuator component actuating position when the pin actuator is rotated to the pin actuator second position.

According to another aspect, a vehicle seat dual-motion actuator includes a first actuator component rotatable between a first actuator component rest position and a first actuator component actuating position, a second actuator component rotatable between a second actuator component rest position and a second actuator component actuating position, and a pin actuator rotatable in a first rotatable direction and a second rotatable direction that is opposite the first rotatable direction. The pin actuator is cooperatively engaged with the first actuator component such that rotation of the pin actuator in the first rotatable direction from a pin actuator rest position moves the first actuator component from the first actuator component rest position toward the first actuator component actuating position, and further wherein the pin actuator is cooperatively engaged with the second actuator component such that rotation of the pin actuator in the second rotatable direction from the pin actuator rest position moves the second actuator component from the second actuator component rest position toward the second actuator component actuating position.

According to a further aspect, a method for operating two vehicle seat features with a single dual-motion actuator includes providing a first actuator component rotatable between a first actuator component rest position and a first actuator component actuating position, providing a second actuator component rotatable between a second actuator component rest position and a second actuator component actuating position, and providing a pin actuator rotatable in a first rotatable direction and a second rotatable direction that is opposite the first rotatable direction. The method further includes rotating the pin actuator in the first rotatable direction from a pin actuator rest position to move the first actuator component from the first actuator rest position toward the first actuator actuating position and rotating the pin actuator in the second rotatable direction from the pin actuator rest position to move the second actuator component from the second actuator rest position toward the second actuating position.

BRIEF DESCRIPTION OF THE DRAWINGS

FIGS. 8A-8C schematically illustrate respective movements of components of the dual-motion actuator of FIGS. 6 and 7.

DETAILED DESCRIPTION

Figure 1A:
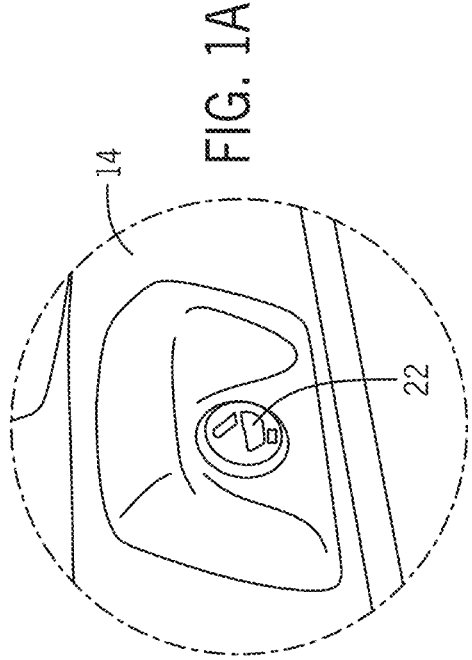
FIG. 1A illustrates a first button provided on the seat back of FIG. 1 for actuating powered movement of the vehicle seat to the access position.
Figure 1B:
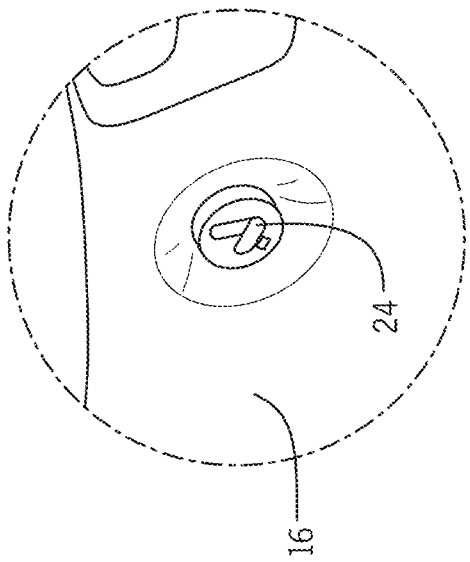
FIG. 1B illustrates a second button provided on the seat base of FIG. 1 for alternatively actuating powered movement of the vehicle seat to the access position.
Figure 1:
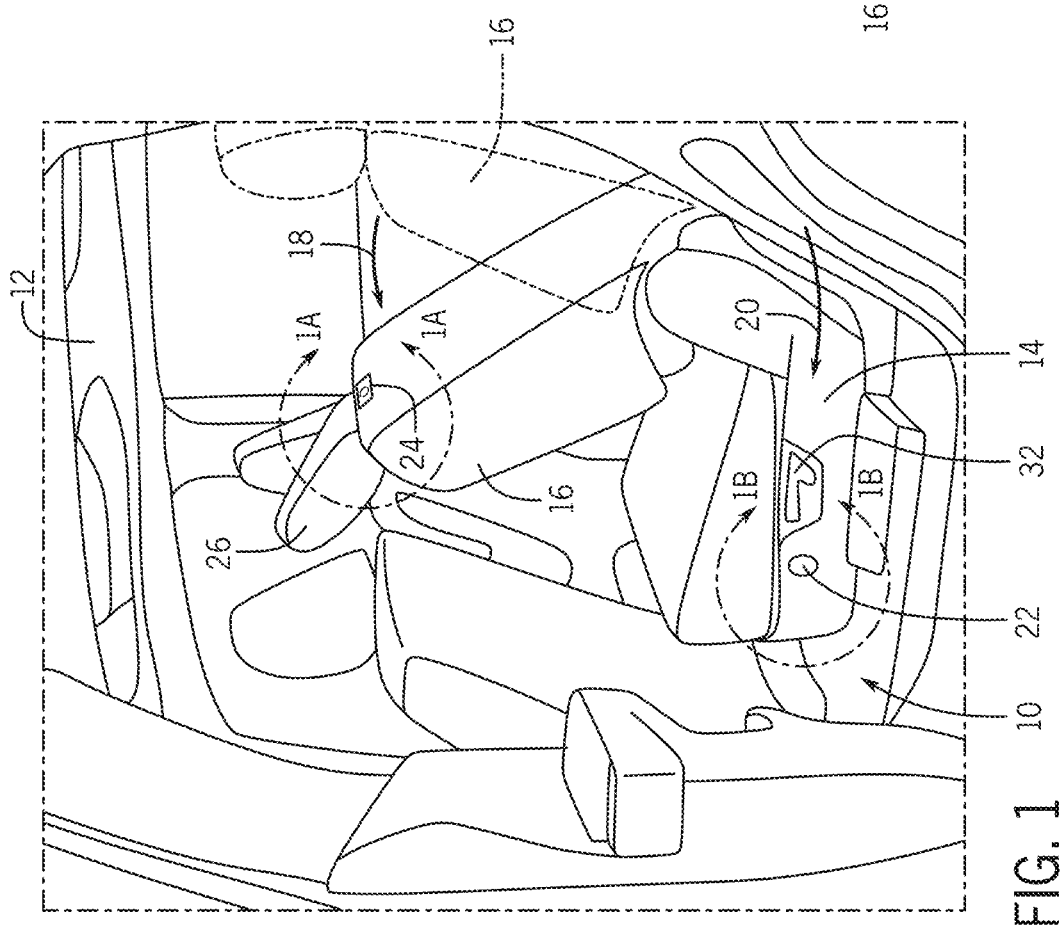
FIG. 1 is a schematic perspective view showing a vehicle seat moveable from an upright position to an access position wherein a seatback thereof is partially folded forward and a seat base thereof is slidable forward, such as for providing access behind the vehicle seat.

Referring now to the drawings, wherein the showings are for purposes of illustrating one or more exemplary embodiments and not for purposes of limiting the same, FIG. 1 schematically illustrates a vehicle seat 10 disposed or provided in a vehicle 12. For example, the vehicle seat 10 can be provided as a rear seat in the vehicle 12, such as behind a forward row of seats in the vehicle 12. The vehicle seat 10 includes a seat base 14 slidably provided or disposed in the vehicle 12 and a seatback 16 pivotally secured to the seat base 14. According to a first seat feature, the vehicle seat 10 is movable from a seating position (shown in phantom in FIG. 1) suitable for accommodating a seated passenger to an access position wherein the vehicle seat 10 is arranged to more easily provide access behind the vehicle seat 10. In particular, when the first seat feature is actuated, the seatback 16 is rotatable relative to the seat base 14 as indicated by arrow 18 to a partially rotated position wherein the seatback 16 is partially folded over onto the seat base 14 but is not in a fold-flat position relative to the seat base 14. Also, the seat base 14, as illustrated by arrow 20, is slidably movable within the vehicle 12.

With additional reference to FIGS. 1A and 1B, seat buttons 22, 24 can be disposed on the vehicle seat 10 for actuating the first seat feature (i.e., to place the vehicle seat 10 in the access position). In particular, the seat button 22 is provided on the seat base 14 and the seat button 24 is provided on the seatback 16, such as adjacent a headrest 26 of the vehicle seat 10. As will be described in more detail below, pressing of either of the seat buttons 22, 24 can electronically actuate the first seat feature (i.e., moving the seat to the access state or position). In particular, pressing of either of the seat buttons 22 or 24 causes a motor and a corresponding actuator (e.g., motor 28 and actuator 30 in FIG. 3) to move the seat 10 from the upright position to the illustrated access position or state wherein the seat base 14 slides forward and the seatback 16 partially folds over the seat base 14 as shown in FIG. 1.

Figure 2:
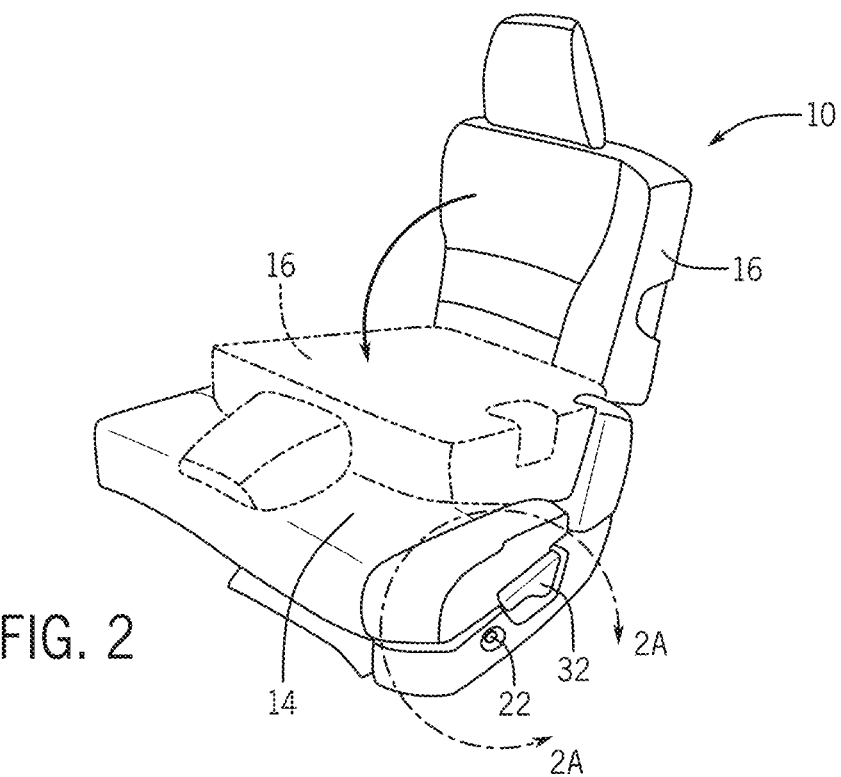
FIG. 2 is a schematic perspective view showing the vehicle seat of FIG. 1 in isolation (i.e., removed from the vehicle) and shows the seatback movable from the upright position to a fold-down position wherein the seatback is fully folded forward onto the seat base.
Figure 2A:
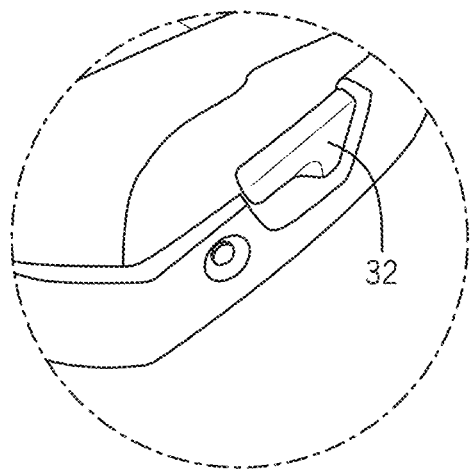
FIG. 2A illustrates a manual lever provided on the seat base for manual actuation for moving the seatback to the fold-down position.

With additional reference to FIG. 2, the vehicle seat 10 is shown in isolation to illustrate a second seat feature wherein the seatback 16 is movable to a fold-flat position. In particular, in FIG. 2, the vehicle seat 10 is shown movable from the upright position to a fold-flat position (also referred to herein as a fold-down mode or state) wherein the seatback 16 folds flat against the seat base 14. With additional reference to FIG. 2A, an actuator lever 32 is disposed on the seat base 14 rearwardly of the seat button 22. Manual lifting of the actuator lever 32 causes the seatback 16 to fold over flat against the seat base 14.

Figure 3:
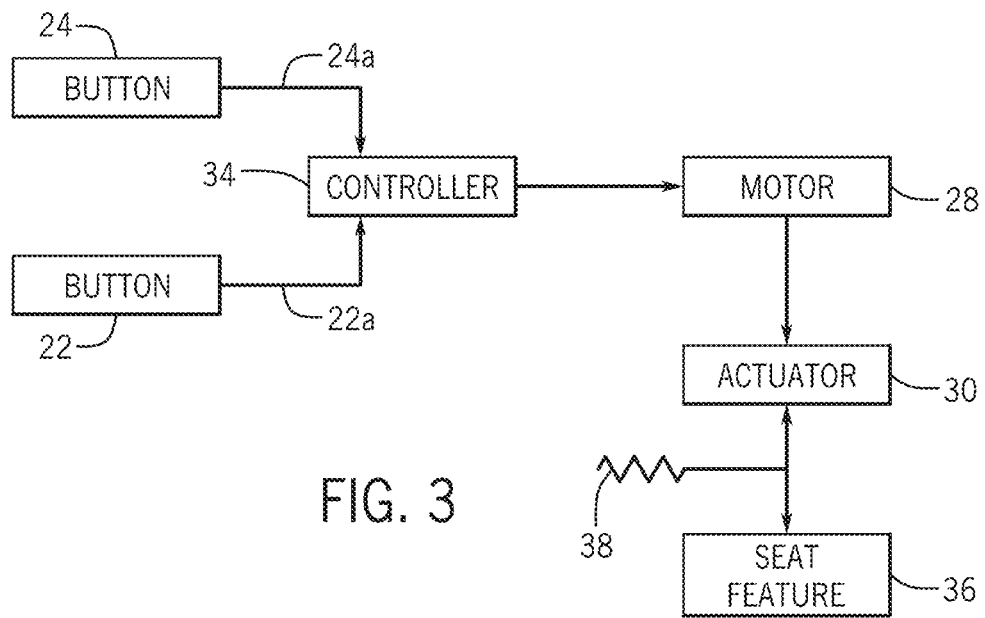
FIG. 3 schematically illustrates an operating system for a seat control system providing button actuation of a seat feature on a vehicle seat using a single motor combined with a single actuator.

With additional reference to FIG. 3, an operating environment is shown wherein motor 28 and actuator 30 are configured to operate a first vehicle seat feature 36. In particular, in the operating environment, the seat buttons 22 and 24 can be operatively connected to a controller 34, which is itself operatively connected to the motor 28. As will be described in more detail below, the motor 28 can be mechanically coupled to the actuator 30 for selective operation of the first seat feature 36. In one embodiment, the seat feature 36 can be the access mode for the vehicle seat 10 illustrated in FIG. 1. In operation, pressing either of the seat buttons 22 or 24 sends an electronic signal 22a or 24a to the controller 34.

Upon receipt of one of the signals 22a or 24a, the controller 34 operates to provide power to the motor 28. This in turn provides motive force to the actuator 30 resulting in actuation of the seat feature 36. In particular, the actuator 30 can be driven by the motor to apply a pulling force to an actuating wire (e.g., wire 66 in FIG. 4), which in turn can for example release a latch that allows a spring urging to move the vehicle seat as is known and understood by those skilled in the art. Accordingly, pressing of one of the buttons 22 or 24 can result in the motor 28 and the actuator 30 moving the vehicle seat 10 from the upright position to the access mode shown in FIG. 1 (i.e., the access mode being the seat feature 36 operated by the motor 28 and the actuator 30). A external spring 38 (e.g., external to the actuator 30) can return the actuator 30 to its rest position (i.e., pre-actuation position) as will be described in more detail below.

Figure 4:
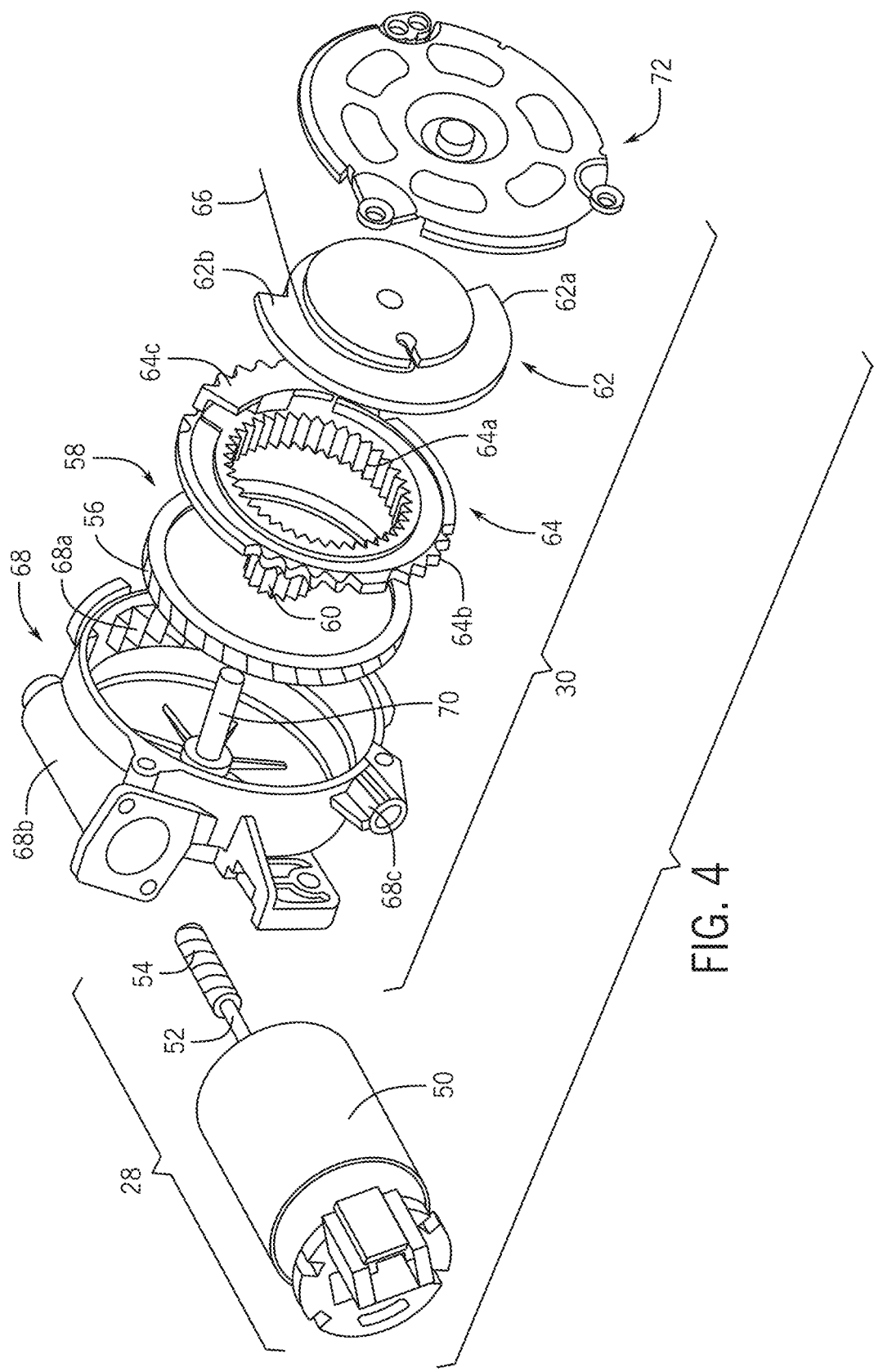
FIG. 4 is a schematic exploded perspective view of a motor and actuator suitable for use within the operating environment illustrated in FIG. 3.

With reference to FIG. 4, the motor 28 and the actuator 30 are illustrated according to one known embodiment. As shown schematically, the motor 28 includes a motor housing 50 and a drive shaft 52. Distally disposed on the drive shaft 52 is a worm 54 that meshingly engages with a worm gear or wheel 56 disposed on a sun gear component 58. The sun gear component 58 includes a sun gear 60 meshingly engaged with planetary gears (not shown) disposed on an actuating component 62. The planetary gears are also meshingly engaged with internal teeth 64a of a fixed ring gear 64. The actuating component 62 is operatively connected to an operating wire 66. The sun gear component 58, the fixed ring gear 64, and the actuating component 62 are accommodated or received within a housing 68. In particular, the sun gear component 58 and the actuating component 62 are rotatably disposed within the housing 68 about pin 70. The fixed ring gear 64 is fixably secured within the housing 68 so that the fixed ring gear 64 does not rotate relative to the housing 68. In the illustrated embodiment, the fixed ring gear 64 includes external teeth 64b that engage internal teeth 68a on the housing 68 to prevent relative rotation between the fixed ring gear 64 and the housing 68. As shown, the housing 68 can include a motor shaft portion 68b into which the drive shaft 52 is received for cooperatively engaging the worm gear 56 of the sun gear component 58 via the worm 54 distally disposed on the drive shaft 52. The housing 68 can also include a wire portion 68c through which the wire 66 passes for connection to a seat feature (e.g., seat feature 36). The housing 68 can also include an endcap 72 for closing the sun gear component 58, the actuating component 62, and the fixed ring gear 64 within the housing 68.

In operation, power is supplied to the motor 28 resulting in rotation of the drive shaft 52 and the worm 54 thereon. This rotation results in rotation of the sun gear component 58 via the meshing engagement between the worm 54 and the worm gear 56. Rotation of the sun gear component 58 results in rotation of the actuating component 62 via the sun gear 60 and the planetary gears. Rotation of the actuating component 62 results in pulling of the wire 66 to actuate the seat feature (e.g., such as seat feature 36 and/or the access mode for the vehicle seat 10). As shown, the fixed ring gear 64 can include a stopper portion 64c that limits relative rotation of the actuating component 62 via actuating component portions 62a, 62b prevented from rotating past the stopper portion 64c. An external spring, such as the schematically illustrated spring 38 in FIG. 3, can be used to return the actuating component 62 to its pre-actuating position after power is disconnected from the motor 28.

One drawback of the motor 28 and the actuator 30 is that only actuation of a single seat feature is provided for. To operate an addition seat feature, such as the fold-over feature of FIG. 2, an additional motor and actuator would be needed. This would increase costs for the vehicle and possibly result in vehicle layout concerns (i.e., there may not be enough space for a second motor and actuator to be easily accommodated within a vehicle).

Figure 5:
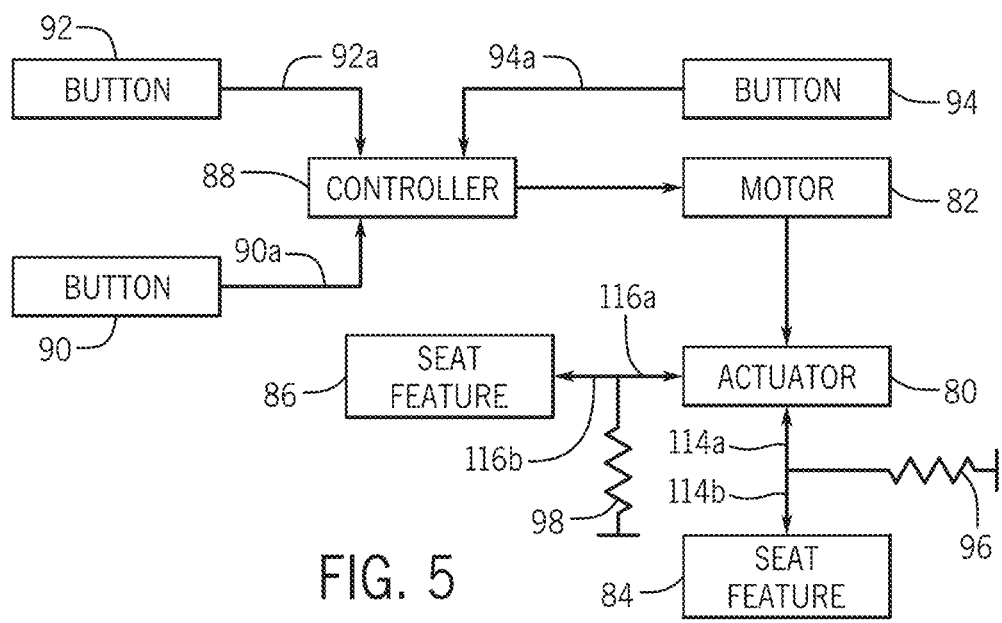
FIG. 5 schematically illustrates an operating environment for a seat control system having a single motor dual-motion actuator that operates two seat features via push button actuation according to an exemplary embodiment.

With reference now to FIG. 5, an operating environment is illustrated wherein a single motor dual-motion actuator 80 is provided according to an exemplary embodiment. As will be described in more detail below, the dual-motion actuator 80, also referred to herein as a vehicle seat dual-motion actuator, is mechanically coupled to an electric motor 82. The motor 82 is drivable in a first motor direction wherein the actuator 80 actuates a first seat feature 84 for a vehicle and also operable in a second motor direction for actuation of a second seat feature 86 by the dual-motion actuator 80. The motor 82 can be operatively connected to a controller 88 for control thereof. In particular, the controller 88 can operate so as to drive the motor 82 in the first motor direction when appropriate and in the second motor direction when appropriate. Buttons 90, 92, and 94 can be operatively connected to the controller 88. In one embodiment, the buttons 90 and 92 can operate so as to send respective signals 90*a*, 92*a* to the controller 88 wherein, upon receipt of one of the signals 90*a* or 92*a*, the controller 88 operates the motor 82 in the first motor direction to operate the first seat feature 84 via the dual-motion actuator 80. The button 94 can also be operatively connected to the controller 88 and thus can send a signal 94*a* to the controller 88 when pressed. In particular, when the controller 88 receives the signal 94*a* from the button 94, the controller 88 can operate the motor 82 in a second motor direction to actuate the second seat feature 86 via the dual-motion actuator 80. Like the spring 38 in FIG. 3, springs 96, 98 can be provided external to the dual motor actuator 80 for returning the dual motor actuator 80 to a pre-actuation condition or state after actuation, respectively, of the seat features 84 or 86. In one embodiment, the controller 88 operates the motor 82 in the desired first or second motor direction by simply reversing the polarity of power provided to the motor 82 (e.g., +/−polarity is provided to the motor 82 for operating the motor 82 in the first motor direction and −/+polarity is provided to the motor 82 for operating the motor 82 in the second motor direction).

Figure 6:
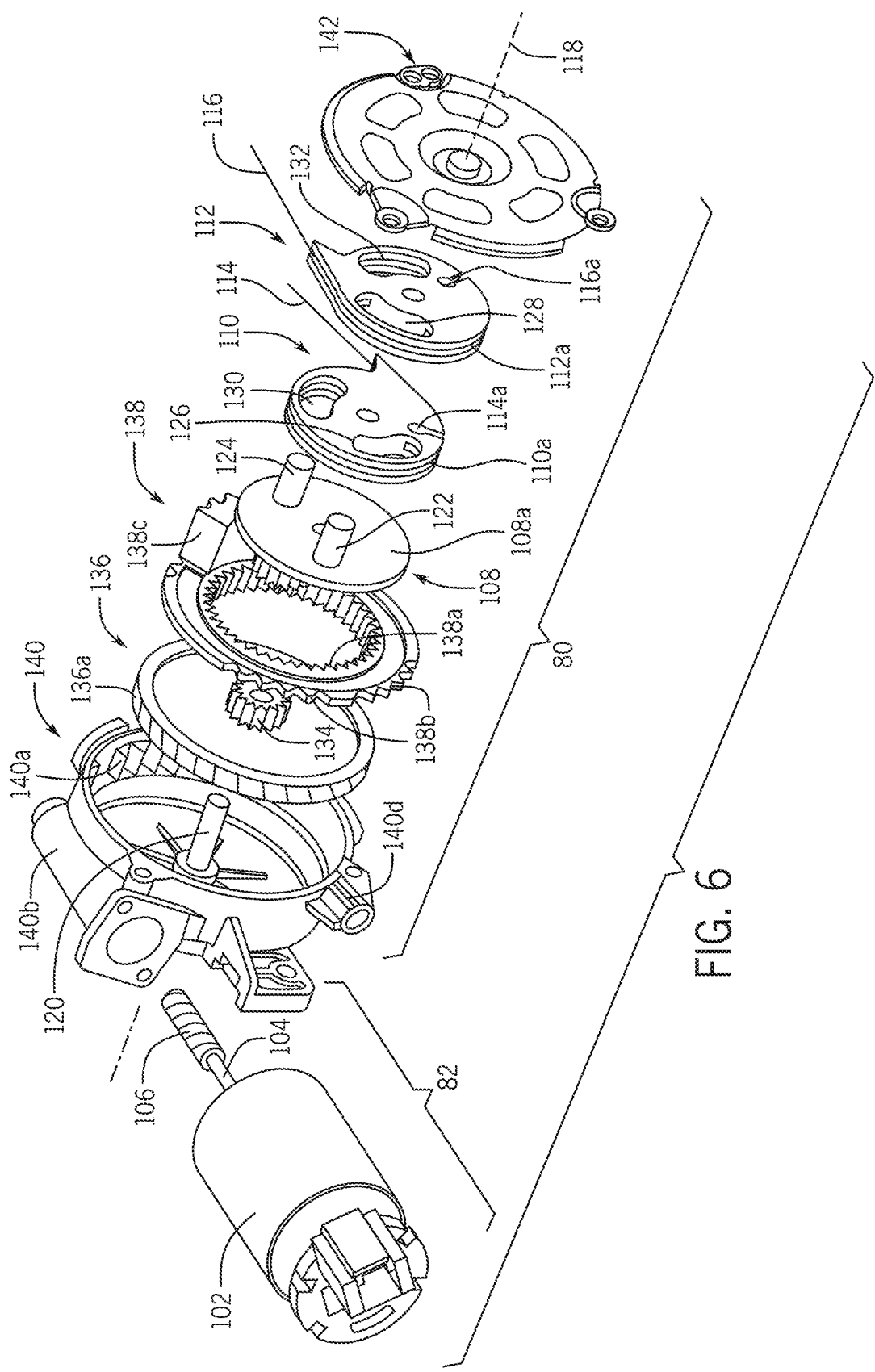
FIG. 6 is a schematic exploded perspective view of a motor and a corresponding dual-motion actuator suitable for use in the operating environment of FIG. 5 according to an exemplary embodiment.
Figure 7:
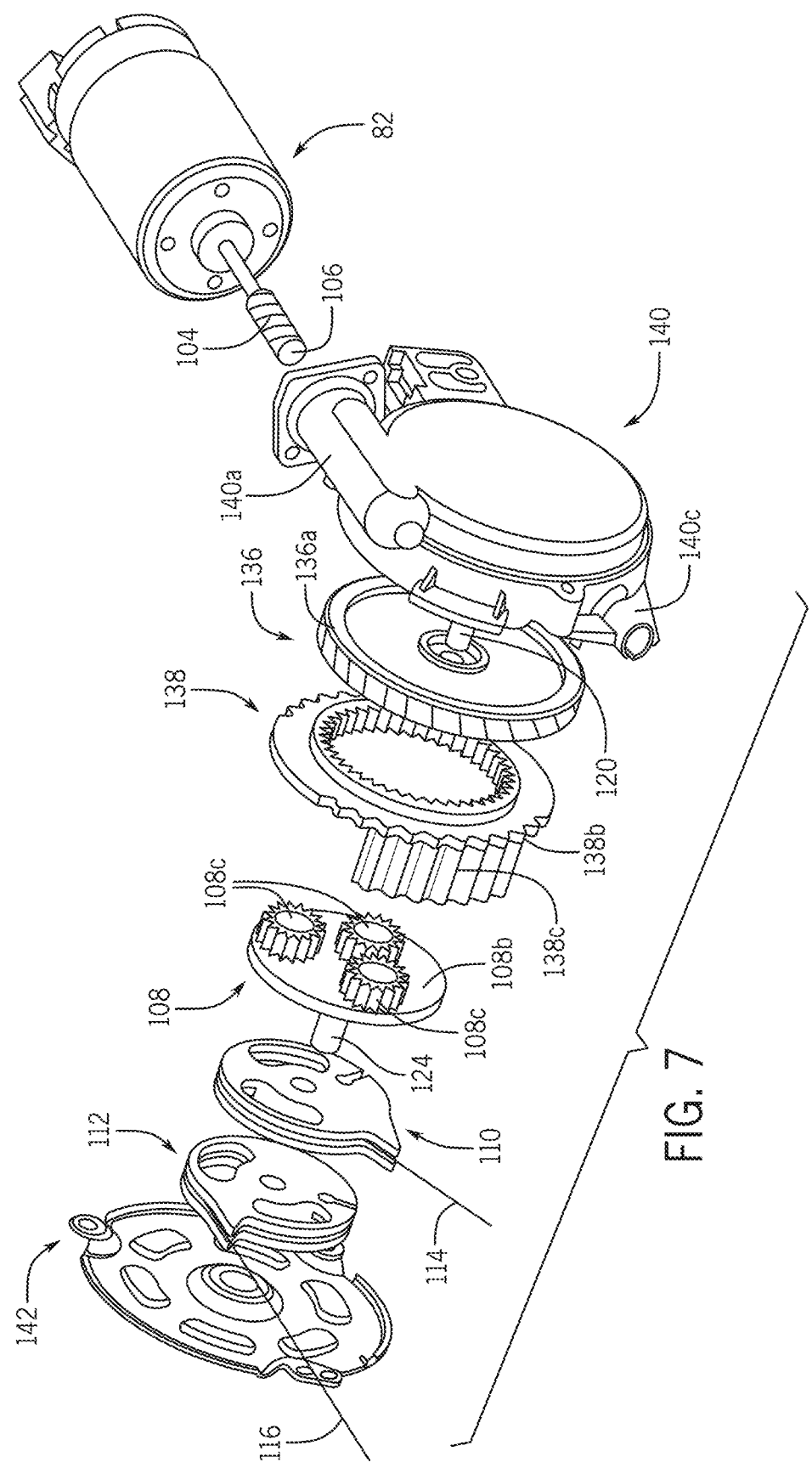
FIG. 7 is a schematic exploded perspective view of the dual-motion actuator of FIG. 6 shown from a reverse perspective.

With additional reference to FIGS. 6 and 7, the dual-motion actuator 80 and the motor 82 are shown according to an exemplary embodiment. In particular, the motor 82 can be the same or similar to the motor 28 of FIG. 4. Thus, the motor 82 can include a motor housing 102, a drive shaft 104 with a worm 106 disposed distally thereon. In contrast, and unlike the single motion actuator 30 of FIG. 4, the dual-motion actuator provides dual-motions depending on whether the motor 80 is driven in the first motor direction or the second motor direction. Accordingly, and as will be described in more detail below, the actuator 80 can provide operation of two seat features (e.g., features 84, 86 of FIG. 5) requiring two actuating motions while only be driven by a single motor 80.

More particularly, in the illustrated embodiment, the dual-motion actuator 80 includes a pin actuator 108, a first actuator component 110, and a second actuator component 112. As will be described in more detail below, the pin actuator 108 is rotatable in a first rotatable direction (clockwise in FIG. 6) from a pin actuator rest position (shown in FIGS. 8A and 9A) toward a pin actuator first position (shown in FIGS. 8B and 9B) and rotatable in a second rotatable direction (counterclockwise in FIG. 6) from the pin actuator rest position toward a pin actuator second position (shown in FIGS. 8C and 9C). The second rotatable direction is opposite the first rotatable direction. As will also be described in more detail below, the first actuator component 110 is co-rotatable with the pin actuator 108 from a first actuator component rest position (FIGS. 8A and 9A) in the first rotatable direction toward a first actuator component actuating position (FIGS. 8B and 9B) when the pin actuator 108 has rotated to the pin actuator first position. Likewise, the second actuator component 112 is co-rotatable with the pin actuator 108 from a second actuator component rest position (FIGS. 8A and 9A) and the second rotatable direction toward a second actuator component actuating position (FIGS. 8C and 9C) when the pin actuator 108 is rotated to the pin actuator second position.

Particularly, in the illustrated embodiment, the first actuator component 110 is a pulley actuator having a circumferential groove 110*a* defined circumferentially therein that accommodates a first actuator pulley wire 114. The first actuator pulley wire 114 has one end 114*b* fixedly secured to the first actuator component 110 and an opposite end (FIG. 5) fixedly secured to the seat feature 84, which can be a first actuator vehicle seat pull actuator (not shown). In the illustrated embodiment, the first actuator component 110 is a first pulley actuator (i.e., having the first actuator pulley wire 114 operatively connected thereto) and the second actuator component 112 is a second pulley actuator. Accordingly, the second pulley actuator 112 has a circumferential groove 112*a* defined therein that accommodates a second actuator pulley wire 116. Like the first actuator pulley wire 114, the second actuator pulley wire 116 has one end 116*a* fixedly secured to the second actuator component 112 and an opposite end 116*b* (FIG. 5) fixedly secured to the second seat feature 86, which can be a second vehicle seat pull actuator (now shown).

The pin actuator 108 rotates in the first and second rotatable directions about an actuator axis 118. In particular, and as shown in the illustrated embodiment, a pin 120 can define the actuator axis 118 and can rotatably pass through each of the pin actuator 108, the first actuator component 110, and the second actuator component 112 so that these components 108, 110, 112 are rotatably disposed about the pin 120 for rotation about the actuator axis 118. In the illustrated embodiment, the pin 120 has one end fixed or attached to housing 140. As shown, the pin actuator 108 has at least one pin (e.g., pair of spaced apart pins 122, 124 in the illustrated embodiment) extending in an axial direction relative to the actuator axis 118. The at least one pin (e.g., pins 122, 124) rotatably engages at least one of the first actuator components 110 and the second actuator component 112 for rotating the at least one of the first actuator component 110 and the second actuator component 112.

More particularly, the at least one pin can extend through at least one first actuator slotted aperture (e.g., apertures 126, 130) defined axially into the first actuator component 110 and through at least one second actuator slotted aperture (e.g., apertures 128, 132) defined axially into the second actuator component 112. In the illustrated embodiment, the at least one pin includes two spaced apart pins 122, 124. The pin 122 extends through first actuator slotted first aperture 126 defined axially into the first actuator component 110 and through second actuator slotted first aperture 130 defined axially into the second actuator component 112. Likewise, the pin 124 extends through first actuator second slotted aperture 130 defined axially into the first actuator component 110 and through second actuator slotted second aperture 132 defined axially into the second actuator component 112.

As shown, the pin actuator 108 has a first axial side 108*a* from which the pins 122, 124 extend in the axial direction and a second axial side 108*b*. The pin actuator 108 also has at least one pin actuator gear fixedly arranged on the second axial side 108*b* for driving rotation of the pin actuator 108 in the first and second rotatable directions. In the illustrated embodiment, the at least one pin actuator gear is a plurality of planetary gears 108*c*. In particular, the gears 108*c* of the plurality of planetary gears 108*c* are arranged and spaced circumferentially about the actuator axis 118 and are meshingly engaged with a sun gear 134 disposed on a sun gear component 136 such that rotation of the sun gear component 136 and the sun gear 134 in the first rotatable direction rotates the pin actuator 108 in the first rotatable direction and rotation of the sun gear component 136 and the sun gear 134 in the second rotatable direction rotates the pin actuator 108 in the second rotatable direction.

Also in the illustrated embodiment, the plurality of planetary gears 108c are also meshingly engaged with internal gear teeth 138a of a ring gear or a ring gear component 138 annularly disposed about the plurality of planetary gears 108c and the sun gear 134. As shown, the sun gear 134 is fixedly disposed on the sun gear component 136 such that when the sun gear component 136 is rotated in the first and second rotatable directions via meshing engagement with the motor 82 as will be further described below. In particular, the sun gear component 136 can include worm gear teeth 136a about a circumference thereof that are meshingly engaged with the worm 106 disposed distally on the drive shaft 104 of the motor 82.

The sun gear component 136, the ring gear component 138, the pin actuator 108, the first actuator component 110, and the second actuator component 112 can be accommodated within a housing 140. In particular, these components can be received within the housing 140 and an endcap 142 can be secured to the housing 140. The housing 140 can include internal teeth 140a that meshingly engage with external teeth 138b of the ring gear component 138 to prevent relative rotation of the ring gear component 138 relative to the housing 140. The housing 140 can also include a motor shaft portion 140b that receives the drive shaft 104 from the motor 82. The housing 140 can further include pulley portions 140c and 140d for, respectively, accommodating the pulley wires 114, 116 and allowing these wires 114, 116 to pass through an exit the housing 140 for connecting to the respective seat features 84, 86. As already discussed herein, external springs, schematically shown as springs 96, 98 in FIG. 5, can be disposed in association with the pulley wires 114, 116 for urging the first and second actuator components 110, 112 toward their respective rest positions (in the position shown in FIGS. 8A and 9A). Accordingly, the springs 96, 98 can return the first and second actuator components 110, 112 to their respective rest positions after movement to the respective actuating positions via the motor 82 ceases.

Figure 9A:
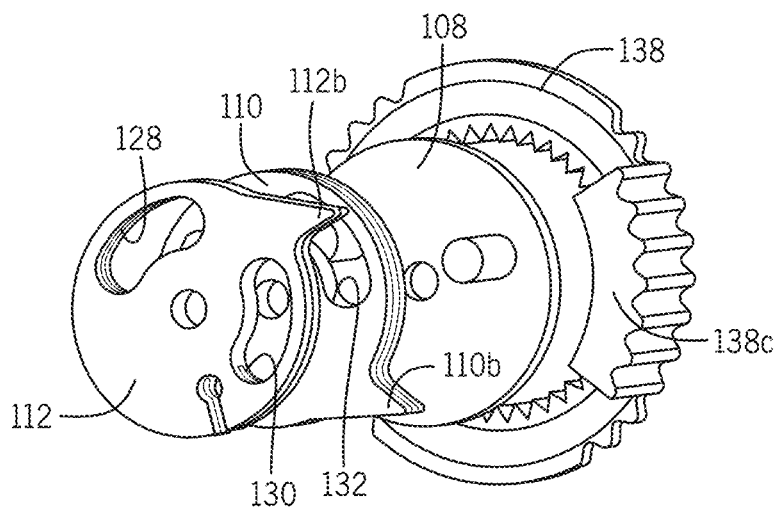
FIGS. 9A-9C schematically illustrate the same positions as FIGS. 8A-8C but are shown in an exploded perspective view.

With additional reference to FIGS. 8A-8C and 9A-9C, operation of the dual-motion actuator 80 will be further described. As already discussed hereinabove, the pin actuator 108 is cooperatively engaged with the first actuator component 110 such that rotation of the pin actuator 108 in the first rotatable direction, as indicated by arrows 150 in FIGS. 8B and 9B, from the pin actuator rest position shown in FIG. 8A and FIG. 9A moves the first actuator component 110 from the first actuator component rest position as shown in FIGS. 8A and 9A toward the first actuator component actuating position shown in FIGS. 8B and 9B. As also already discussed hereinabove, the pin actuator 108 is cooperatively engaged with the second actuator component 112 such that rotation of the pin actuator 108 in the second rotatable direction, the direction indicated by arrows 152 in FIGS. 8C and 9C, from the pin actuator rest position shown in FIGS. 8A and 9A moves the second actuator component 112 from the second actuator component rest position shown in FIGS. 8A and 9A toward the second actuator component actuating position shown in FIGS. 8C and 9C.

Figure 9B:
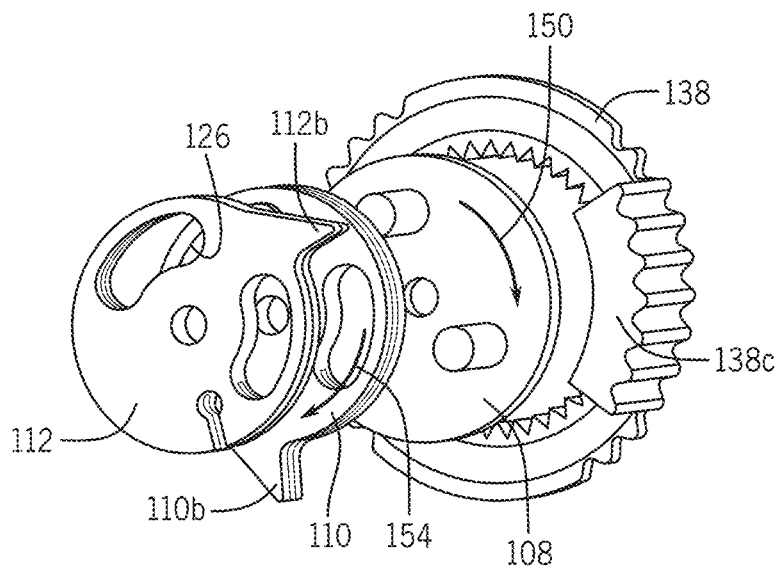
Figure 9C:
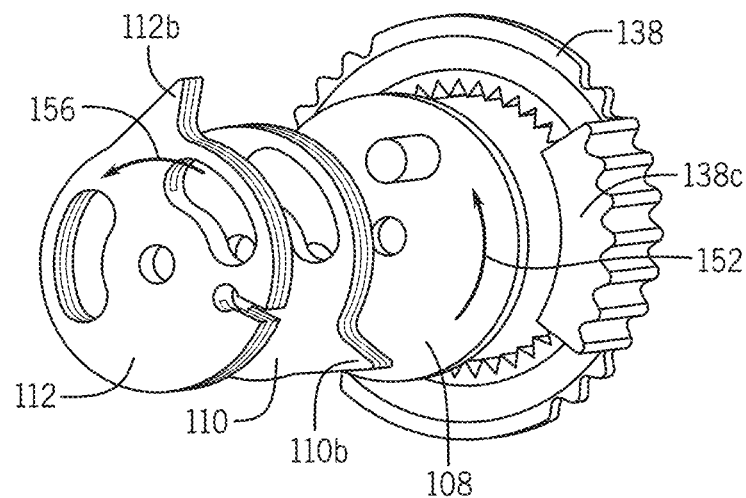

In contrast, the cooperative engagement between the pin actuator 108 and the first actuator component 110 allows for relative rotation between the first actuator component 110 and the pin actuator 108 when the pin actuator 108 is rotated in the second rotatable direction from the pin actuator rest position (FIGS. 8A and 9A) such that the first actuator component 110 does not rotate when the pin actuator 108 is rotated in the second rotatable direction from the pin actuator rest position to the pin actuator second position (FIGS. 8C and 9C). In other words, the pin actuator 108 rotates relative to the first actuator component 110 when the pin actuator 108 is rotated in the second rotatable direction from the pin actuator rest position (FIGS. 8A and 9B) toward the pin actuator second position (FIGS. 8C and 9B. Likewise, the cooperative engagement between the pin actuator 108 and the second actuator component 112 allows for relative rotation between the second actuator component 112 and the pin actuator 108 when the pin actuator 108 is rotated in the first rotatable direction from the pin actuator rest position (FIGS. 8A and 9A) such that the second actuator component 112 does not rotate when the pin actuator 108 is rotated in the first rotatable direction from the pin actuator rest position to the pin actuator first position (FIGS. 8B and 9B). In other words, the pin actuator 108 rotates relative to the second actuator component 112 when the pin actuator 108 is rotated in the first rotatable direction from the pin actuator rest position (FIGS. 8A and 9A) toward the pin actuator first position (FIGS. 8B and 9B).

More specifically, the cooperative engagement between the pin actuator 108 and the first actuator component 110 is formed by engagement of the pins 122, 124 with the first actuator component 110 and the cooperative engagement between the pin actuator 108 and the second actuator component 112 is formed by engagement of the pins 122, 124 with the second actuator component 112. In particular, the respective cooperative engagements are formed via the pins 122, 124 being received through the slotted apertures 126-332 of the actuating components 110, 112.

The slotted apertures 126-132 are such that relative rotation of the pin actuator 108 is allowed for a limited distance without co-rotation of the first actuator component 110 when the pin actuator 108 is rotated in the second rotatable direction and without co-rotation of the second actuator component 112 when the pin actuator 108 is rotated in the first rotatable direction. Movement of the respective one of the first actuator component 110 and the second actuator component 112 in the respective rotatable directions is illustrated by arrows 154 and 156. Such movement of the respective first and second actuator components 110, 1124 results in pulling of the respective pulley wires 114, 116 which thereby results in actuation of the corresponding seat features 84, 86 (FIG. 5). After actuation, the respective springs 96, 98 return the actuator components 110, 112 to their respective resting positions.

Rotation of each of the first and second actuator components 110, 112 in the respective first and second rotatable directions as indicated by arrows 154 and 156 is limited or restricted by engagement of respective fin portions 110b, 112b with a stopper or stopper portion 138c disposed on the ring gear component 138. In particular, rotation of the first actuating component 110 in the first rotatable direction indicated by arrow 154 is stopped or limited by the fin portion 110b engaging the stopper 138c. Likewise, rotation of the second actuating component 112 in the second rotatable direction indicated by arrow 156 is stopped or limited by the fin portion 112b engaging the stopper 138c.

According to the foregoing, when desired to actuate the first seat feature 84, the motor 82 is operated such that the drive shaft 104 rotates in a first rotatable direction turning the worm 106, which in turn rotates the sun gear component 136. The sun gear 134 then transmits rotation reversibly to the pin actuator 108 to rotate the pin actuator 108 in the first rotatable direction thereby rotating the first actuator component 110 as indicated by arrow 154. Similarly, reversing the direction of the motor 82 causes the drive shaft 104 to rotate in the reverse direction, which in turn causes the sun gear component 136 to rotate in the reverse direction resulting in rotation of the pin actuator 108 in the second rotatable direction. This rotates the second actuating component 112 in the second rotatable direction as indicated by arrow 156 resulting in actuation of the second seat feature 86.

Advantageously, this allows for two motions to be achieved by the dual-motion actuator 80 with operation by only a single motor 82. Reversing of the motor 82, in one example, can be achieved by reversing polarity to the motor. Accordingly, referring to FIG. 5, the controller 88 can operate the motor 82 in a first direction corresponding to rotation of the pin actuator 108 in a first rotatable direction when one of the buttons 90 or 92 is pressed and can rotate the motor 82 in the reverse direction for rotation of the pin actuator 108 in the second rotatable direction when the button 94 is pressed. In one embodiment, as already discussed hereinabove, the buttons 90, 92 can be associated with an access mode for a vehicle seat. Additionally, the button 94 can be associated with a fold-flat state for the vehicle seat.

A method for operating two vehicle seat functions with a dual-motion actuator will now be described. In particular, the method will be described in association with the operating environment illustrated in FIG. 5, though this is not required and other operating environments can be used. In the method, the first actuator component 110 is provided so as to be rotatable between the first actuator component rest position (FIGS. 8A and 9A) and a first actuator component actuating position (FIGS. 8B and 9B). The second actuator component 112 is provided so as to be rotatable between the second actuator component rest position (FIGS. 8A and 9A) and the second actuator component actuating position (FIGS. 8C and 9C). The pin actuator 108 is also provided, and in particular provided so as to be rotatable in the first rotatable direction and the second rotatable direction that is opposite the first rotatable direction. The method further includes rotating the pin actuator 108 in the first rotatable direction from the pin actuator rest position to move the first actuator component 110 from the first actuator rest position toward the first actuator actuating position. Alternative, the pin actuator 108 can be rotated in the second rotatable direction from the pin actuator rest position to move the second actuator component from the second actuator rest position toward the second actuating position.

As already discussed herein, rotating the pin actuator 108 in the first rotatable direction from the pin actuator rest position to move the first actuator component 110 from the first actuator rest position toward the first actuator actuating position does not rotate the second actuator component 112. Likewise, rotating the pin actuator 108 in the second rotatable direction from the pin actuator rest position to move the second actuator component 112 from the second actuator rest position toward the second actuating position does not rotate the first actuator component 110. As already described herein, rotation of the pin actuator 108 in either the first rotatable rotation or the second rotatable direction is achieved simply by reversing the direction of the motor 82 such that a single motor 82 via the dual-motion actuator 80 is able to provide dual-motions for operating two seat features, such as seat features 84, 86.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A single motor dual-motion actuator for a vehicle seat, comprising:
   a pin actuator rotatable in a first rotatable direction from a pin actuator rest position toward a pin actuator first position and rotatable in a second rotatable direction from the pin actuator rest position toward a pin actuator second position, the second rotatable direction opposite the first rotatable direction;
   a first actuator component co-rotatable with the pin actuator from a first actuator component rest position in the first rotatable direction toward a first actuator component actuating position when the pin actuator is rotated to the pin actuator first position; and
   a second actuator component co-rotatable with the pin actuator from a second actuator component rest position in the second rotatable direction toward a second actuator component actuating position when the pin actuator is rotated to the pin actuator second position.

2. The actuator of claim 1 wherein the pin actuator rotates relative to second actuator component when the pin actuator is rotated in the first direction from the pin actuator rest position toward the pin actuator first position.

3. The actuator of claim 2 wherein pin the actuator rotates relative to the first actuator component when the pin actuator is rotated in the second direction from the pin actuator rest position toward the pin actuator second position.

4. The actuator of claim 1 wherein the first actuator component is a pulley actuator having a circumferential groove defined therein that accommodates a first actuator pulley wire, the first actuator pulley wire having one end fixedly secured to the first actuator component and an opposite end fixedly secured to a first vehicle seat feature.

5. The actuator of claim 1 wherein the first actuator component is a first pulley actuator and the second actuator component is a second pulley actuator, the second pulley actuator having a circumferential groove defined therein that accommodates a second actuator pulley wire, the second actuator pulley wire having one end fixedly secured to the second actuator component and an opposite end fixed secured to a second vehicle seat feature.

6. The actuator of claim 1 wherein the pin actuator rotates in the first and second rotatable directions about an actuator axis, and further wherein the pin actuator has at least one pin extending in an axial direction relative to the actuator axis, the at least one pin rotatably engaging at least one of the first actuator component and the second actuator component for rotating said at least one of the first actuator component and the second actuator component.

7. The actuator of claim 6 wherein the at least one pin extends through at least one first actuator slotted aperture defined axially into the first actuator component and through at least one second actuator slotted aperture defined axially into the second actuator component.

8. The actuator of claim 6 wherein the pin actuator has a first axial side from which the at least one pin extends in the axial direction and a second axial side, the pin actuator having at least one pin actuator gear fixedly arranged on the second axial side for driving rotation of the pin actuator in the first and second rotatable directions.

9. The actuator of claim 8 wherein the at least one pin actuator gear is a plurality of planetary gears arranged and spaced circumferentially about the actuator axis that are meshingly engaged with a sun gear such that rotation of the sun gear in the first rotatable direction rotates the pin actuator in the second rotatable direction and rotation of the sun gear in the second rotatable direction rotates the pin actuator in the first rotatable direction.

10. The actuator of claim 9 wherein the plurality of planetary gears are also meshingly engaged with internal gear teeth of a ring gear annularly disposed about the plurality of planetary gears and the sun gear.

11. The actuator of claim 10 wherein the sun gear is fixedly disposed on a sun gear component, the sun gear component rotated in the first and second rotatable directions via meshing engagement with a motor.

12. The actuator of claim 11 wherein the sun gear component, the ring gear, the pin actuator, the first actuator component and the second actuator component are accommodated within a housing.

13. A vehicle seat dual-motion actuator, comprising:
a first actuator component rotatable between a first actuator component rest position and a first actuator component actuating position;
a second actuator component rotatable between a second actuator component rest position and a second actuator component actuating position; and
a pin actuator rotatable in a first rotatable direction and a second rotatable direction that is opposite the first rotatable direction,
wherein the pin actuator is cooperatively engaged with the first actuator component such that rotation of the pin actuator in the first rotatable direction from a pin actuator rest position moves the first actuator component from the first actuator component rest position toward the first actuator component actuating position, and further wherein the pin actuator is cooperatively engaged with the second actuator component such that rotation of the pin actuator in the second rotatable direction from the pin actuator rest position moves the second actuator component from the second actuator component rest position toward the second actuator component actuating position.

14. The actuator of claim 13 wherein said cooperative engagement between the pin actuator and the first actuator component allows for relative rotation between the first actuator component and the pin actuator when the pin actuator is rotated in the second rotatable direction from the pin actuator rest position such that the first actuator component does not rotate when the pin actuator is rotated in the second rotatable direction from the pin actuator rest position.

15. The actuator of claim 14 wherein said cooperative engagement between the pin actuator and the second actuator component allows for relative rotation between the second actuator component and the pin actuator when the pin actuator is rotated in the first rotatable direction from the pin actuator rest position such that the second actuator component does not rotate when the pin actuator is rotated in the first rotatable direction from the pin actuator rest position.

16. The actuator of claim 13 wherein the pin actuator has a first side and a second side, and further wherein the pin actuator includes a pair of spaced apart pins extending from the first side toward the first and second actuator components, said cooperative engagement between the pin actuator and the first actuator component formed by engagement of said pair of spaced apart pins with the first actuator component and said cooperative engagement between the pin actuator and the second actuator component formed by engagement of said pair of spaced apart pins with the second actuator component.

17. The actuator of claim 13 wherein each of the first and second actuator components is a pulley actuator having a pulley wire circumferentially wrapped thereabout and fixed thereto.

18. A method for operating two vehicle seat features with a single dual-motion actuator, comprising:
providing a first actuator component rotatable between a first actuator component rest position and a first actuator component actuating position;
providing a second actuator component rotatable between a second actuator component rest position and a second actuator component actuating position;
providing a pin actuator rotatable in a first rotatable direction and a second rotatable direction that is opposite the first rotatable direction;
rotating the pin actuator in the first rotatable direction from a pin actuator rest position to move the first actuator component from the first actuator rest position toward the first actuator actuating position; and
rotating the pin actuator in the second rotatable direction from the pin actuator rest position to move the second actuator component from the second actuator rest position toward the second actuating position.

19. The method of claim 18 wherein said rotating the pin actuator in the first rotatable direction from a pin actuator rest position to move the first actuator component from the first actuator rest position toward the first actuator actuating position does not rotate the second actuator component, and wherein said rotating the pin actuator in the second rotatable direction form the pin actuator rest position to move the second actuator component from the second actuator rest position toward the second actuating position does not rotate the first actuator component.

20. The method of claim 18 wherein:
said rotating the pin actuator in the first rotatable direction from a pin actuator rest position to move the first actuator component from the first actuator rest position toward the first actuator actuating position occurs via a single motor operatively connected to the pin actuator rotating the pin actuator in the first rotatable direction, and
said rotating the pin actuator in the second rotatable direction form the pin actuator rest position to move the second actuator component from the second actuator rest position toward the second actuating position occurs via said single motor rotating the pin actuator in the second rotatable direction.

* * * * *